United States Patent

Togawa

[11] Patent Number: 5,844,639
[45] Date of Patent: Dec. 1, 1998

[54] PLASMA ADDRESSED LIQUID CRYSTAL DISPLAY DEVICE

[75] Inventor: Takahiro Togawa, Kanagawa, Japan

[73] Assignee: Sony Corporation, Tokyo, Japan

[21] Appl. No.: 727,220

[22] Filed: Oct. 8, 1996

[30] Foreign Application Priority Data

Oct. 12, 1995 [JP] Japan ................................ 7-264489

[51] Int. Cl.⁶ .......................... G02F 1/133; G02F 1/1339
[52] U.S. Cl. ............................................. 349/32; 349/153
[58] Field of Search ........................ 349/32, 153

[56] References Cited

U.S. PATENT DOCUMENTS

| | | | |
|---|---|---|---|
| 4,536,060 | 8/1985 | Takamatsu et al. | 349/153 |
| 4,640,583 | 2/1987 | Hoshikawa et al. | 349/153 |
| 5,335,103 | 8/1994 | Kim | 349/153 |
| 5,349,455 | 9/1994 | Hayashi et al. | 349/32 |
| 5,351,144 | 9/1994 | Tanamachi | 349/32 |

FOREIGN PATENT DOCUMENTS

| | | |
|---|---|---|
| 0 567 019 | 10/1993 | European Pat. Off. . |
| 0 597 432 | 5/1994 | European Pat. Off. . |
| 4-267224 | 9/1992 | Japan ................. 349/153 |
| 5-297384 | 11/1993 | Japan ................. 349/153 |

*Primary Examiner*—Anita Pellman Gross
*Attorney, Agent, or Firm*—Hill & Simpson

[57] ABSTRACT

To provide a plasma addressed liquid crystal display device which can enhance the bonding strength between the dielectric sheet and the plasma substrate glass, a frit seal is provided at the outside of the barrier ribs, and dummy barrier ribs and a frit seal are sequentially provided on the outside of the frit seal. The frit seal has a greater width than that of the frit seal and has a role as a reinforcing member. The dielectric sheet and a plasma substrate glass are provided so as to sandwich the barrier ribs. A liquid crystal layer is provided on a surface side of the dielectric sheet.

4 Claims, 6 Drawing Sheets

PLASMA ADDRESSED LIQUID CRYSTAL DISPLAY DEVICE

BACKGROUND OF THE INVENTION

1. Field of the Invention

The present invention relates to a plasma addressed liquid crystal display device having a inventive improvement in its frit seal.

2. Description of the Related Art

Figure 1:
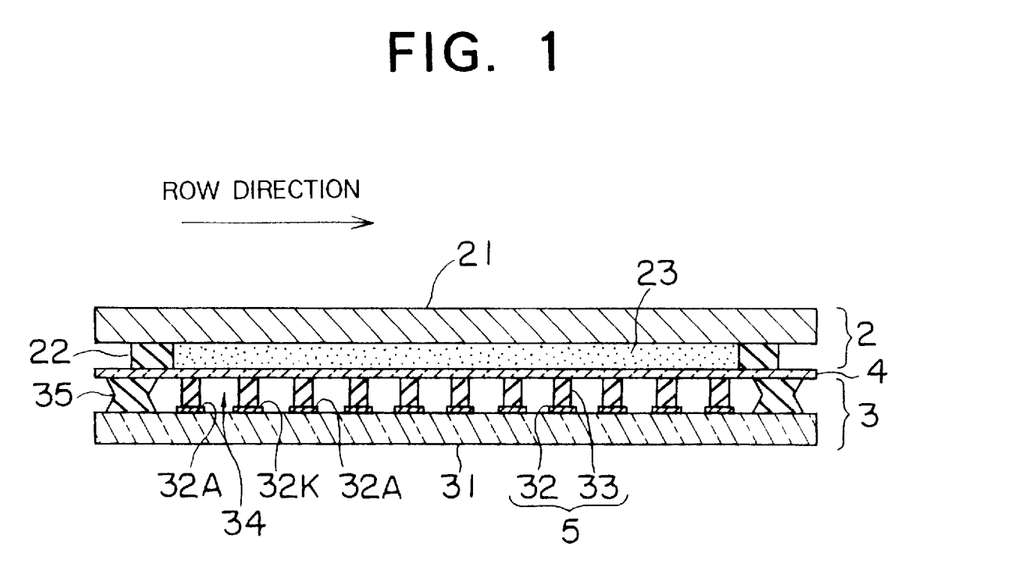
FIG. 1 is a schematic cross-sectional view of the configuration of a conventional plasma addressed liquid crystal display device.

In recent years, a plasma addressed liquid crystal display device (PALC) comprising a liquid crystal cell and plasma cell superposed via a dielectric sheet has been proposed. FIG. 1 is a view showing the configuration of this plasma addressed liquid crystal display device of the related art.

The plasma addressed liquid crystal display device of FIG. 1 has a flat panel configuration in which the liquid crystal cell 2 and the plasma cell 3 are superposed with a dielectric sheet 4 therebetween.

In the liquid crystal cell 2, a color filter substrate 21 is joined via a liquid crystal sealing material 22 to the dielectric sheet 4 in a state with a predetermined gap formed therebetween. On the inside surface of the color filter substrate 21, data electrodes in the form of stripes comprising a transparent electrically conductive material extending in a row direction are formed in parallel in the column direction (vertical direction in the figure) though not illustrated. A liquid crystal is filled in the gap between the color filter substrate 21 and the dielectric sheet 4 to form a liquid crystal layer 23. Note that, although it is not shown in FIG. 1, spacers are arranged in the liquid crystal layer 23 so as to make the dimensions of gap uniform.

In the plasma cell 3, the plasma substrate glass 31 faces the dielectric sheet 4 with a predetermined gap therebetween. On the plasma substrate glass 31 on the dielectric sheet 4 side, display electrodes 32 in the form of stripes extending in the column direction and formed in parallel with a predetermined gap therebetween in the row direction are formed. On the display electrodes 32, barrier ribs 33 made of an insulating ceramic or the like and having a narrower width than that of the display electrode 32 are formed so as to be superimposed on the display electrode 32 at an equal pitch. Via these display electrodes 32 and barrier ribs 33, the plasma substrate glass 31 faces the dielectric sheet speed therefrom by a predetermined gap. These display electrodes 32 and barrier ribs 33 constitute barrier ribs 5. The sealed spaces defined by the barrier ribs 5 constitute plasma chambers 34. The plasma chambers 34 extend in the column direction and are formed with a predetermined gap in the row direction.

In the plasma chambers 34, an ionizable gas is sealed. As this gas, for example, helium, neon, argon, or a mixed gas of them is used. In this way, the display electrodes 32 and the barrier ribs 33 perform the function of barrier ribs dividing the plasma chambers and, at the same time, perform the function of gap spacers of the plasma chambers too. Note that, the display electrodes 32 are respectively connected to a driver so that they alternately become anode electrodes 32A and cathode electrodes 32K. On the periphery of the plasma substrate glass 31, a ring-shaped frit seal 35 formed using a low melting point glass or the like is arranged. The plasma substrate glass 31 and the dielectric sheet 4 are tightly bonded by this frit seal 35.

In the plasma addressed liquid crystal display device, the data display electrodes and the plasma chambers 34 are orthogonal, the data electrodes become the column driving units, the plasma chambers 34 become the row driving units, and pixels are defined at the points of intersection.

In such a plasma addressed liquid crystal display device, when a predetermined voltage is applied between an anode electrode 32A and a display electrode 32K, the gas of the part of that plasma chamber 34 is selectively ionized and a plasma discharge is generated. The inside thereof is maintained at approximately the anode potential. When the data voltage is applied to the data electrode in this state, the data voltage is written in the liquid crystal layers 23 of the pixels arranged in the column direction corresponding to this plasma chamber 34 via the dielectric sheet 4. When the plasma discharge is ended, the plasma chamber 34 is at a floating potential, and the voltage written in the liquid crystal layer 23 of the corresponding pixel is held until the next writing period (for example after one frame). At this time, the plasma chamber 34 acts as a sampling switch, and the liquid crystal layer 23 of each pixel acts as a sampling capacitor.

By the operation of the liquid crystal by the data voltage written from the data electrode 15 with respect to the liquid crystal layer 23 of each pixel, the display is carried out in units of pixels. Accordingly, by sequentially scanning the plasma chambers 34 in the row direction by generating the plasma discharge and writing the data voltage in the liquid crystal layers 23 of a plurality of pixels arranged in the column direction, the display of a two-dimensional image can be carried out.

Figure 2A:
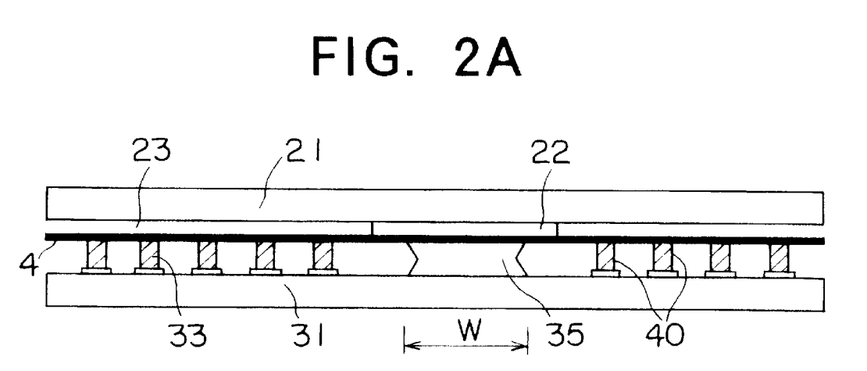
FIGS. 2A and 2B are schematic cross-sectional views of the configuration for explaining the disadvantage of the plasma addressed liquid crystal display device shown in FIG. 1.

FIG. 2A is a cross-sectional view of principal parts near the frit seal 35 of the plasma liquid crystal display device shown in FIG. 1.

As shown in FIG. 2A, a dummy barrier rib 40 is provided on the right of the frit seal 35 in the figure. The optimum value of the width W of the frit seal 35 is about 2 mm.

Figure 2B:
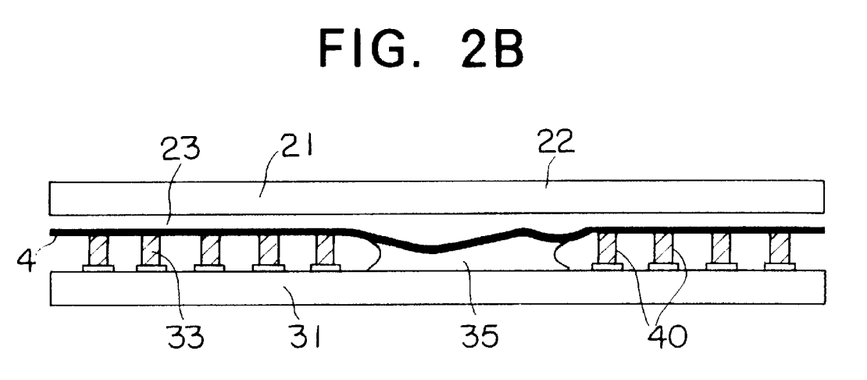

Namely, this is because when the width W of the frit seal 35 is too great, when the bonding surface of the frit seal 35 is softened at the time of bonding, as shown in FIG. 2B, the dielectric sheet 4 is deformed to a wavy shape, the sealing function of the liquid crystal sealing material 22 is no longer adequate, and the gap of the liquid crystal layer 23 located at the periphery of the liquid crystal sealing material 22 varies so that many faulty portions are produced.

Figure 3A:
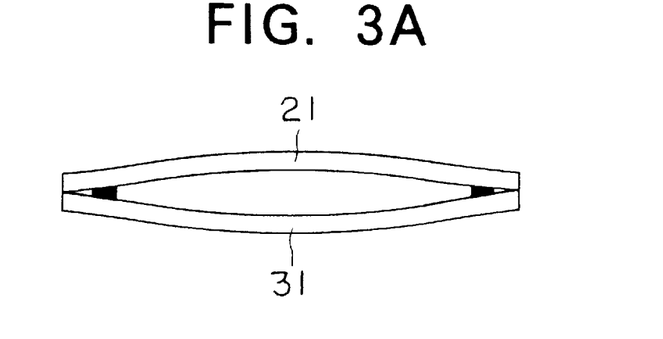
FIGS. 3A and 3B are schematic cross-sectional views of the configuration for explaining the disadvantage of the plasma addressed liquid crystal display device shown in FIG. 1.
Figure 3B:
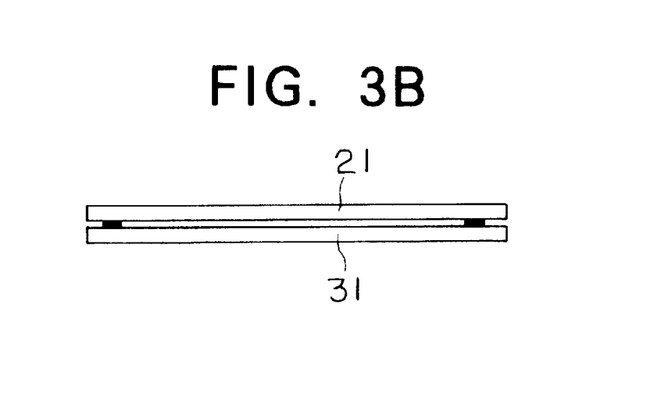

In the plasma addressed liquid crystal display device mentioned before, however, the width W of the frit seal 35 is about 2 mm, the bonding area between the frit seal 35, the dielectric sheet 4, and the plasma substrate glass 31 is small and the bonding strength is weak, thus it suffers from a disadvantage in that the dielectric sheet 4 and the plasma substrate glass 31 will peel from the frit seal 35. Namely, in the manufacturing process, warping is produced in the color filter substrate 21 and the plasma substrate glass 31. The color filter substrate 21 and the plasma substrate glass 31 are bonded as shown in FIG. 3A and the warping is corrected as shown in FIG. 3B. At this time, force is added to the color filter substrate 21 and the plasma substrate glass 31 in the direction peeling them from each other. At this time, the bonding strength between the dielectric sheet 4 and the plasma substrate glass 31 via the plasma substrate glass 31 is weaker than the bonding strength between the dielectric sheet 4 and the color filter substrate 21, so the dielectric sheet 4 and the color filter substrate 21 sometimes peel apart.

SUMMARY OF THE INVENTION

An object of the present invention is to provide a plasma addressed liquid crystal display device with which the bonding strength between the dielectric sheet and the plasma substrate glass can be enhanced without generation of unevenness of the gap of the liquid crystal layer.

A plasma addressed liquid crystal display device of the present invention is a plasma addressed liquid crystal display device wherein a plasma addressed liquid crystal display device, comprising a first substrate having transparent electrodes arranged in a column on an inner surface, an intermediate sheet adhered at a gap to the first substrate and a liquid crystal layer held in the gap, a plasma cell comprising a second substrate having discharge electrodes arranged in a row, a plurality of barrier ribs on an inner surface and an ionizable gas sealed between the second substrate and the intermediate sheet by providing a bonding means outside of the barrier ribs, and a ring-shaped strengthening (reinforcing) means which is provided between the second substrate and the intermediate sheet being formed on outside of the bonding means.

Preferably, the dummy barrier ribs are provided between the bonding means and the strengthening means.

Preferably, the height of the dummy barrier rib is not more than the height of the barrier rib.

In another embodiment, the strengthening means exhibits a continuous ring shape.

In another embodiment, the strengthening means exhibits a discontinuous ring shape.

Preferably, the strengthening means has a width greater than that of the bonding material.

BRIEF DESCRIPTION OF THE DRAWINGS

The above and other objects and features of the present invention will be described more in detail with reference to the accompanying drawings, in which.

DESCRIPTION OF THE PREFERRED EMBODIMENTS

Below, an explanation will be made of the plasma addressed liquid crystal display device according to an embodiment of the present invention.

Figure 4:
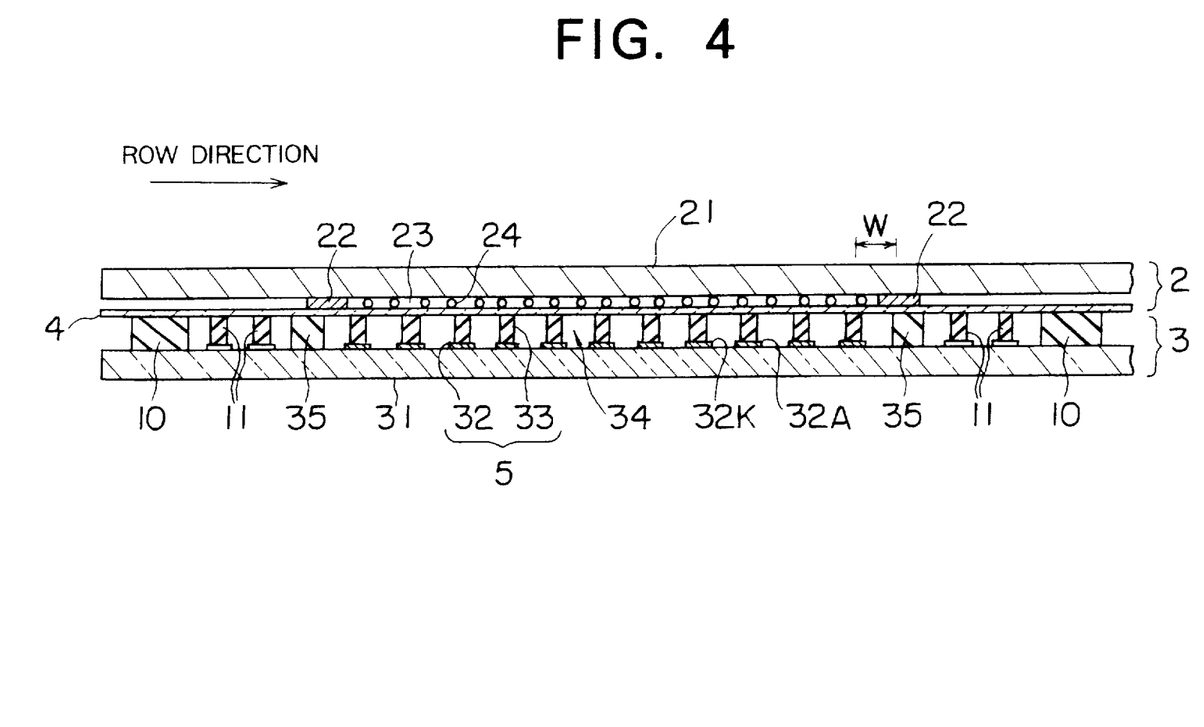
FIG. 4 is a schematic cross-sectional view of the configuration of a plasma addressed liquid crystal display device according to an embodiment of the present invention.

FIG. 4 is a schematic cross-sectional view of the configuration of the plasma addressed liquid crystal display device according to the present embodiment.

As shown in FIG. 4, the plasma addressed liquid crystal display device according to the present embodiment has a flat panel configuration in which a liquid crystal cell 2 and a plasma cell 3 are superposed via a dielectric sheet 4.

In the liquid crystal cell 2, a color filter substrate 21 is joined to the dielectric sheet 4 in a state with a predetermined gap therebetween into which is provided the liquid crystal sealing material 22. On the inside surface of the color filter substrate 21, data electrodes in the form of stripes comprising a transparent electrically conductive material extending in a row direction are formed in parallel in the column direction (into the figure) though not illustrated. A liquid crystal material is filled in the gap between the color filter substrate 21 and the dielectric sheet 4 to form the liquid crystal layer 23.

In FIG. 4, spacers 24 are arranged in the liquid crystal layer 23 so as to make the gap uniform.

In the plasma cell 3, the plasma substrate glass 31 faces the dielectric sheet 4 with a predetermined gap therebetween. On the plasma substrate glass 31 on the dielectric sheet 4 side, display electrodes 32 in the form of stripes extending in the column direction and formed in parallel with a predetermined gap in the row direction are formed. On the display electrodes 32, barrier ribs 33 made of an insulating ceramic or the like and having a narrower width than that of the display electrodes 32 are formed so as to be superimposed on the display electrodes 32 at an equal pitch. The plasma substrate glass 31 faces the dielectric sheet 4 with a predetermined gap therebetween due to these display electrodes 32 and barrier ribs 33. These display electrodes 32 and barrier ribs 33 constitute barrier ribs 5. Sealed spaces defined by the barrier ribs 5 constitute plasma chambers 34. The plasma chambers 34 extend in the column direction and are formed with predetermined gaps in the row direction. In the plasma chambers 34, an ionizable gas is sealed. As this gas, for example, helium, neon, argon, or a mixed gas of them is used. In this way, the display electrodes 32 and the barrier ribs 33 perform the function of the barrier ribs dividing the plasma chambers from one another and, at the same time, perform the function of gap spacers of the plasma chambers. Note that, the display electrodes 32 are connected to the driver circuit so that they alternately are used to anode electrodes 32A and cathode electrodes 32K.

Figure 5A:
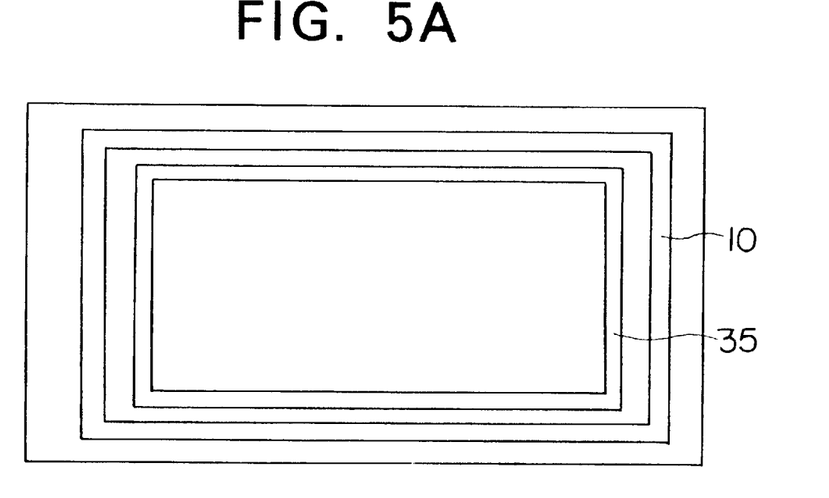
FIGS. 5A and 5B are plan views for explaining the pattern of the frit seal of the plasma addressed liquid crystal display device shown in FIG. 4.

FIG. 5A is a plan view explaining the pattern of the frit seals 35 and 10 of the plasma addressed liquid crystal display device shown in FIG. 4.

As shown in FIG. 4 and FIG. 5A, on the periphery of the plasma substrate glass 31, a ring-like frit seal 35 using a low melting point glass or the like is arranged so as to surround the barrier ribs 5. The plasma substrate glass 31 and the dielectric sheet 4 are tightly bonded by this frit seal 35. The width of the frit seal 35 is for example about 2 mm. Note that the width of the frit seal 35 is determined by considering the breaking strength of the dielectric sheet 4 at the time of bonding, and the optimum value differs in accordance with for example the material and thickness of the dielectric sheet 4.

Further, the distance W from the end of the effective screen area defined by the barrier ribs 5 to the frit seal 35 is for example 1.8 mm or less.

Outside of the frit seal 35, for example, six dummy barrier ribs 11 are provided within a range of about 4.0 mm though not illustrated.

Further, on the outside of the dummy barrier ribs 11, a continuous ring-shaped frit seal 10 serving as a reinforcing means is arranged so as to surround the dummy barrier ribs 11. The width of the frit seal 10 is greater than the width of the frit seal 35 and for example is about 5.0 mm. By making the width of the frit seal 10 greater than the width of the frit seal 35 in this way, the reinforcing function of the frit seal 10 can be enhanced.

Here, after the plasma substrate glass 31 and the dielectric sheet 4 are bonded, the height of the top of the frit seals 10 and 35 must be not more than the top of the barrier ribs 33. This is so as to make the cell gap of the liquid crystal layer 23 uniform when forming the liquid crystal layer 23.

According to the plasma addressed liquid crystal display device of the present embodiment, by providing the frit seal 10 in addition to the frit seal 35, the bonding strength of the dielectric sheet 4 and the plasma substrate glass 31 is enhanced, and as a result, the bonding force between the liquid crystal cell 2 and the plasma cell 3 is enhanced. For this reason, even if the width of the frit seal 35 is about 2 mm, the dielectric sheet 4 and the plasma substrate glass 31 will not peel apart in the manufacturing process.

Further, since the width of the frit seal 35 is about 2 mm, the dielectric sheet 4 will not deform much at all at the time of bonding. For this reason, the sealing function of the liquid crystal sealing material 22 is adequate and, at the same time, the occurrence of unevenness of the gap of the liquid crystal layer 23 can be prevented.

In the plasma addressed liquid crystal display device, the data display electrode and the plasma chamber 34 are orthogonal, the data electrodes becomes column driving units, the plasma chambers 34 become the row driving units, and pixels are defined at points of intersection of the same.

In such a plasma addressed liquid crystal display device, when a predetermined voltage is applied between an anode electrode 32A and a cathode display electrode 32K, the gas of the part of that plasma chamber 34 is selectively ionized and a plasma discharge is generated. The inside thereof is maintained at approximately the anode potential. When the data voltage is applied to the data electrode in this state, the data voltage is written in the liquid crystal layers 23 of the pixels arranged in the column direction corresponding to this plasma chamber 34 via the dielectric sheet 4. When the plasma discharge is ended, the plasma chamber 34 is at a floating potential, and the voltage written in the liquid crystal layer 23 of the corresponding pixel is held until the next writing period (for example after one frame). At this time, the plasma chamber 34 acts as a sampling switch, and the liquid crystal layer 23 of each pixel acts as a sampling capacitor.

By the operation of the liquid crystal by the data voltage written from the data electrode 15 with respect to the liquid crystal layer 23 of each pixel, the display is carried out in units of pixels. Accordingly, by sequentially scanning the plasma chamber 34 in the row direction by generating the plasma discharge and writing the data voltage in the liquid crystal layers 23 of a plurality of pixels arranged in the column direction, the display of a two-dimensional image can be carried out.

Below, an explanation will be made of the manufacturing method of the plasma addressed liquid crystal display device shown in FIG. 4 and FIG. 5A by using FIGS. 6A to 6E.

Figure 6A:
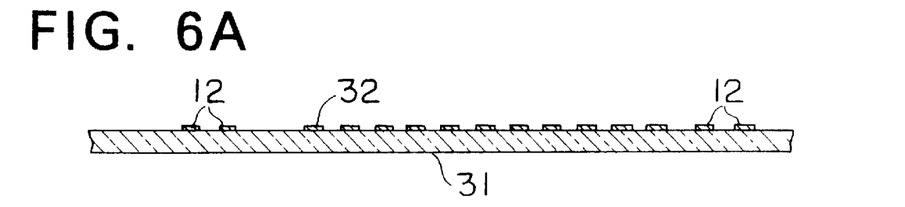
FIGS. 6A to 6E are views for explaining the manufacturing method of the plasma addressed liquid crystal display device shown in FIG. 4.

First, as shown in FIG. 6A, the pattern of the display electrodes is printed on the plasma substrate glass 31 in the form of stripes by for example a screen printing method and is then dried to form the display electrodes 32. Simultaneously with this, dummy display electrodes 12 are formed on the outside of the display electrodes 32.

Figure 6B:
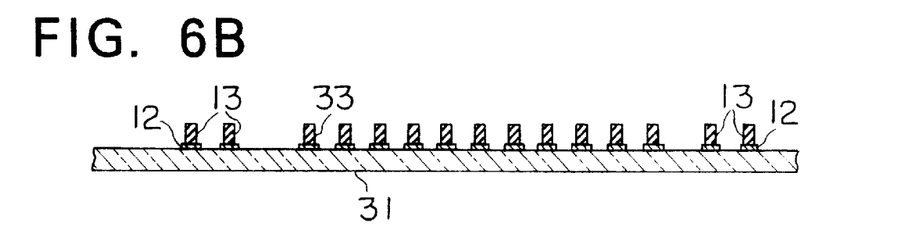

Next, on the display electrodes 32 which are formed in stripes, barrier ribs 33 are superposed at the same pitch as shown in FIG. 6B by screen printing. In this case, in order for the barrier ribs 33 to be made a height of about 200 $\mu$m, the screen printing is repeated to give a double coating and thereby bring the ribs to this height. After printing the barrier ribs of the predetermined height, sintering is carried out and the tops of the barrier ribs are polished to make the heights of the barrier ribs match a predetermined height. Simultaneously with this, the dummy barrier ribs 13 are formed on the dummy display electrodes 12.

Figure 6C:
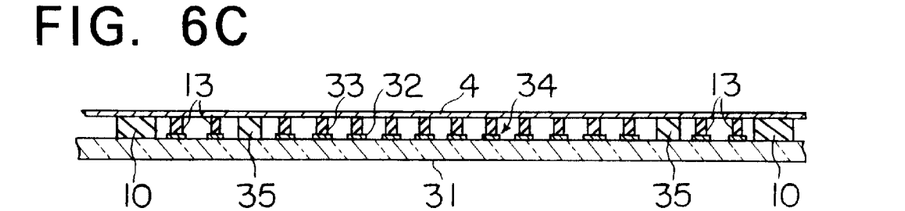

Then, as shown in FIG. 6C, the frit seals 10 and 35 are formed on the periphery of the plasma substrate glass 31 by a dispenser or the like, the dielectric sheet 4 made of glass is bonded to the plasma substrate glass via these frit seals 10 and 35 in a state where the dielectric sheet is placed on the barrier ribs, the formed plasma chamber 34 is evacuated, and then a gas is injected into the plasma chamber.

Figure 6D:
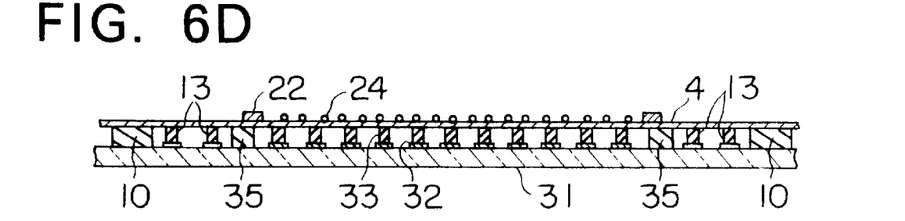
Figure 6E:
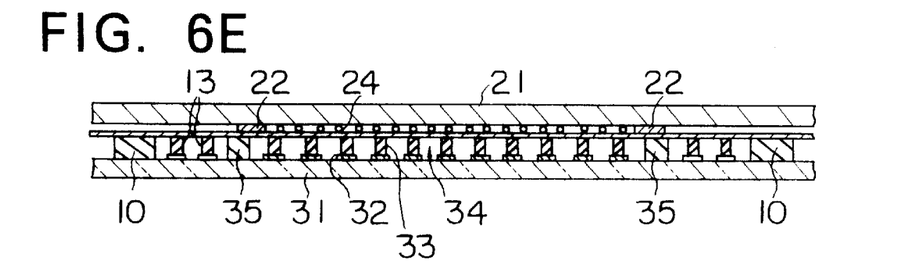

Next, a not illustrated orientation processing is carried out. As shown in FIG. 6D, spacers 24 for making the thickness of the liquid crystal layer uniform are scattered, on the dielectric sheet then, as shown in FIG. 6E, the color filter 21 is bonded to the dielectric sheet 4 via the liquid crystal sealing material 22 to form the liquid crystal chamber, then the liquid crystal is injected, thereby obtaining a plasma addressed liquid crystal display device shown in FIG. 4 and FIG. 5A.

Figure 5B:
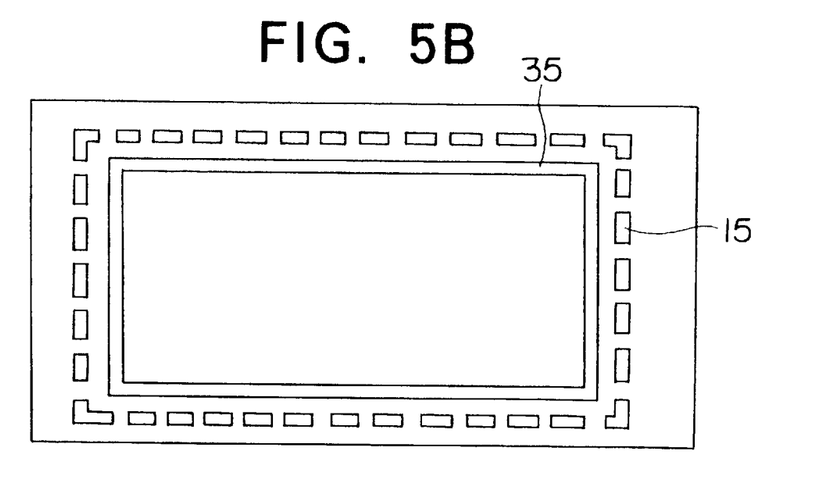

The plasma addressed liquid crystal display device of the present invention is not limited to the above embodiment. For example, in the above embodiment, a continuous ring-shaped frit seal 10 as shown in FIG. 5A was exemplified as the reinforcing means, but in the present invention, it is also possible to use for example a frit seal 15 obtained by intermittently arranging patterns having a block shape in the form of a ring as shown in FIG. 5B. By making the patterns intermittent in this way, the frit seal 15 can be formed with a low manufacturing precision. Note that, in the frit seal 15 having discontinuous patterns, it is also possible to arrange semi-spherical patterns intermittently in the form of a ring. Further, it is also possible to constitute the frit seal 15 by arranging intermittent patterns with thicknesses which change along the longitudinal direction in the form of a ring. Here, where the frit seal 15 is constituted by arranging intermittent patterns in the form of a square ring, if the intermittent patterns are individually arranged at least eight portions, i.e. four corners of the square and the middle points of them, the reinforcing function can be adequately exhibited.

Further, it is also possible to form the dummy barrier ribs outside of the frit seal 10 shown in FIG. 5A. By forming them in this way, it becomes possible to prevent the outside end of the dielectric sheet 4 from drooping and further smoothly seal the dielectric sheet 4 with the frit.

As explained above, according to the plasma addressed liquid crystal display device of the present invention, the bonding strength between the intermediate sheet and the substrate of the plasma cell is enhanced, and as a result, the bonding force between the liquid crystal cell and the plasma cell is enhanced. For this reason, in the manufacturing process, the intermediate sheet and the substrate of the plasma cell will not peel apart. Further, according to the plasma addressed liquid crystal display device of the present invention, the intermediate sheet will not deform much at all at the time of bonding. For this reason, the sealing function of the liquid crystal sealing material can be adequately exhibited and, at the same time, the occurrence of the unevenness of the gap of the liquid crystal layer can be prevented.

Note that the present invention is not limited to the above embodiments and can be modified in various ways within the scope of the present invention.

What is claimed is:

1. A plasma addressed liquid crystal display device, comprising:
   a liquid crystal cell including:
   a first substrate having transparent electrodes arranged in a column direction on an inner surface of said first substrate;
   an intermediate sheet adhered to the first substrate and spaced from said first substrate to define a gap between said intermediate sheet and said first substrate; and
   a liquid crystal layer held in the gap; a plasma cell including:
   a second substrate having discharge electrodes arranged in a row direction, said second substrate having an inner surface facing said intermediate sheet;
   a plurality of barrier ribs on said inner surface of said second substrate;
   an ionizable gas sealed between the second substrate and the intermediate sheet by providing a bonding means outside of the barrier ribs;
   a ring-shaped strengthening means for strengthening which is provided between the second substrate and the intermediate sheet being formed outside of the bonding means; and
   dummy ribs being provided between said bonding means and said strengthening means.

2. A plasma addressed liquid crystal display device as set forth in claim 1, wherein the height of the dummy barrier rib is not more than the height of said barrier rib.

3. A plasma addressed liquid crystal display device, comprising:
   a liquid crystal cell including:
   a first substrate having transparent electrodes arranged in a column direction on an inner surface of said first substrate;
   an intermediate sheet adhered to the first substrate and spaced from said first substrate to define a gap between said intermediate sheet and said first substrate; and
   a liquid crystal layer held in the gap;
   a plasma cell including:
   a second substrate having discharge electrodes arranged in a row direction, said second substrate having an inner surface facing said intermediate sheet;
   a plurality of barrier ribs on said inner surface of said second substrate;
   an ionizable gas sealed between the second substrate and the intermediate sheet by providing a bonding means outside of the barrier ribs; and
   a ring-shaped strengthening means for strengthening which is provided between the second substrate and the intermediate sheet, said strengthening means being of a discontinuous ring shape.

4. A plasma addressed liquid crystal display device, comprising:
   a liquid crystal cell including:
   a first substrate having transparent electrodes arranged in a column direction on an inner surface of said first substrate;
   an intermediate sheet adhered to the first substrate and spaced from said first substrate to define a gap between said intermediate sheet and said first substrate; and
   a liquid crystal layer held in the gap;
   a plasma cell including:
   a second substrate having discharge electrodes arranged in a row direction, said second substrate having an inner surface facing said intermediate sheet;
   a plurality of barrier ribs on said inner surface of said second substrate;
   an ionizable gas sealed between the second substrate and the intermediate sheet by providing a bonding means outside of the barrier ribs; and
   a ring-shaped strengthening means for strengthening which is provided between the second substrate and the intermediate sheet, said strengthening means having a width greater than that of said bonding means.

* * * * *